United States Patent [19]
Martin et al.

[11] Patent Number: 5,835,820
[45] Date of Patent: *Nov. 10, 1998

[54] CONTROL SYSTEM FOR PRINT MEDIA SHEET TRAY ARRANGEMENT OF A PRINTING SYSTEM

[75] Inventors: Andrew T. Martin, Webster; John W. Daughton; John (Jack) F. Gauronski, both of Rochester; David B. Heinzelman, Webster; Susan B. Layer; James F. Matysek, both of Fairport, all of N.Y.

[73] Assignee: Xerox Corporation, Stamford, Conn.

Related U.S. Application Data

[60] Provisional application No. 60/043,630, Apr. 14, 1997.

[21] Appl. No.: 3,312
[22] Filed: Jan. 6, 1998
[51] Int. Cl.[6] .................................................. G03G 21/14
[52] U.S. Cl. .............................. 399/85; 399/389; 399/38
[58] Field of Search ............................... 399/85, 38, 389, 399/391, 361

[56] References Cited

U.S. PATENT DOCUMENTS

4,970,544  11/1990  Furusawa et al. .................. 355/24
5,081,595  1/1992  Moreno et al. .................... 395/111
5,129,639  7/1992  DeHority .......................... 270/1.1

*Primary Examiner*—Richard Moses
*Attorney, Agent, or Firm*—Gary B. Cohen

[57] ABSTRACT

A print media sheet tray control system for use with a printing system having a controller is provided. The control system includes a print media sheet tray which is configurable, through use of the controller, in a selected one of a first operational mode and a second operational mode. The configurable print media sheet tray is characterized by a print media attribute set having a selected state which can be either a first state or a second state. If the configurable print media sheet tray is configured in the first operational mode, then the controller prohibits printing system operation if the selected state has been altered from the first state to the second state. On the other hand, if the configurable print media sheet tray is configured in the second operational mode, then operation of the printing system is permitted provided the alteration was achieved pursuant to a preselected alteration process.

16 Claims, 6 Drawing Sheets

CONTROL SYSTEM FOR PRINT MEDIA SHEET TRAY ARRANGEMENT OF A PRINTING SYSTEM

Priority is claimed to Provisional Application No. 60/043,630 filed Apr. 14, 1997.

BACKGROUND

This invention relates generally to a printing system with one or more print media supply trays and, more particularly, to a control system for the one or more configurable print media supply trays, wherein the degree to which each configurable print media supply tray can be reconfigured is controlled as a function of the operational mode in which the print media supply tray is disposed.

A typical printing system is provided with one or more print media supply trays for feeding a print media sheet to a print engine to receive an image in the form of, for example, a developed image. Commonly, the supply or feed tray is provided with certain size sensing capability for a variety of reasons. In one instance, a knowledge of size allows the system to apprise a user of which sheet sizes can be printed at a host machine. With sheet or stock size taken into account, a user can avoid the situation in which an oversized image is printed on an undersized print media sheet without appropriate reduction/enlargement operation(s).

Media size detection systems are found in various forms. In one common approach, movable guides are provided in one or two dimensions, while detection of guide movement is achieved with a set of sensors or switches. More particularly, as the guides are moved in one direction or another, a corresponding media size is registered at a suitable display. In practice, a media detection system facilitates the configuration of a given print media sheet tray for printing.

Examples of prior art systems to measure (sense) input tray side guide settings, and to use that measurement to estimate the other (orthogonal) dimension of the documents in a known manner from a look-up table stored in memory of standard sizes of sheet, include Xerox Corporation U.S. Pat. Nos. 5,511,771, 4,579,444, 4,745,438 (e.g. Col. 11), 3,689,143, and 4,351,606 and 5,333,852; also U.S. Pat. Nos. and 4,406,537 of others. Also noted is a Xerox Disclosure Journal Publication Vol. 11, No. 2, p. 89, dated March/April 1986, by William A. Henry, II.

In conjunction with a media detection system, a printing system may be provided with the capability of designating a media supply tray with other attribute indications. In a conventional electronic printing system, such as the DocuTech Production Publisher ("DocuTech" is a registered trademark of Xerox Corporation used in conjunction with the sale of electronic printing systems) a given print media tray may be characterized by a size attribute as well as at least two other stock characteristics, namely "type" and color. Accordingly, in one example, a given tray may be characterized by "8.5×11, standard, white". A print media tray arrangement in which the print media trays are characterized by these three print media attributes is shown in the following patent:

U.S. Pat. No. 5,081,595
Patentees: Moreno et al.
Issued: Jun. 14, 1992
U.S. Pat. No. 5,081,595 discloses a printing system including a plurality of print media trays in which the size of the print media is detected for each tray and displayed on the display of a user interface. Additionally, as print media sheets are added to each of the trays, attributes for type and color corresponding with the pint media to be provided are programmed with the user interface. In this way the user of the printing system, typically a system administrator ("SA") knows exactly what type of media is in each tray. Additionally, each job processed by the system includes a job ticket designating the three print media attributes of each print sheet to be processed by the system. By comparing media attributes designated in the job ticket with the attributes programmed at the print media supply trays, the system is able to inform the user as to which print media supply trays are no longer required for processing the current job.

The ability to program print media trays is particularly significant in the network printing area since a remote user or "client" is not necessarily within close proximity of the trays and is thus not able to change corresponding media supply readily. In the following patent, an SA programs each tray which is to accessed by the remote user:

U.S. Pat. No. 5,129,639
Patentee: DeHority
Issued: Jun. 14, 1992
U.S. Pat. No. 5,129,639 discloses a substitution approach in which a job programmed with a certain set of stock attributes cannot be executed at a given printer as a result of a mismatch between what the job calls for, in terms of stock attributes, and what is actually available, in terms of stock at the printer. Preferably, the user either permits the job to be marked with substitute stock, for avoiding the mismatch, or simply allows the given printer or SA to provide a "best match" for the requested stock.

Essentially, each of the print media trays of the printing system of U.S. Pat. No. 5,081,595 and U.S. Pat. No. 5,129,639 are "fully adjustable" in that they can be configured to accommodate for both size and other key media attributes (e.g., type and color). This approach is well suited for those situations in which an SA is present to reprogram the trays each time the print media attributes of a current job change significantly. For example, the printing system of the '595 Patent, as disclosed, teaches that the print media trays are reprogrammed as the requirements of the incoming jobs change. For a machine without an SA, however, the constant reprogramming of all of the print media trays may be undesirable. That is, for a machine with multiple print media trays which does not use a SA, it may still be desirable to constrain the use of a given tray to protect against the eccentricities of a "casual" or "walk-up" user. It would be desirable to provide a printing system with a configurable print media tray that can be programmed for use in a plurality of modes to accommodate for such eccentricities.

Moreover, since the printing systems of the '595 and '639 Patents are "supervised" systems (in that the SA, rather than the job submitter, services the print media sheet trays), it is commonly assured that the SA, who is a skilled user, will pay appropriate attention to the process of reprogramming a tray to accommodate for the addition of print media sheets having one or more attributes varying from the previously loaded print media sheets. This is not always the case with a casual user who might not even think of reprogramming a tray to correspond with print media added thereto. It would be desirable to provide a control scheme that prompts the user to reprogram trays when necessary.

SUMMARY OF THE INVENTION

In accordance with the presently disclosed invention there is provided a print media sheet tray control system for use with a printing system of the type in which image representations generated from image data are marked on print media sheets. The image representations are marked on the print media sheets in response to one or more control instructions provided to the printing system by a system user, and the print media sheet tray control system comprises: a configurable print media sheet tray for storing the print media sheets upon which the image representations are to be marked, the configurable print media sheet tray being characterized by a set of print media attributes disposable in a selected state with the print media attribute set being disposed in a first state, the configurable print media sheet tray being configurable in one or both of a first operational mode and a second operational mode; and a controller for selectively configuring the configurable print media sheet tray into one of the first operational mode and the second operational mode. In practice, the controller disenables printing system operation when the configurable print media sheet tray is disposed in the first operational mode and the system user attempts to operate the printing system with the selected state of the print media attribute set being altered from the first state to a second state, while the controller enables printing system operation when the configurable print media sheet tray is disposed in the second operational mode and the system user has altered the selected state of the print media attribute set from the first state to the second state in accordance with a selected alteration procedure.

DESCRIPTION OF THE INVENTION

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
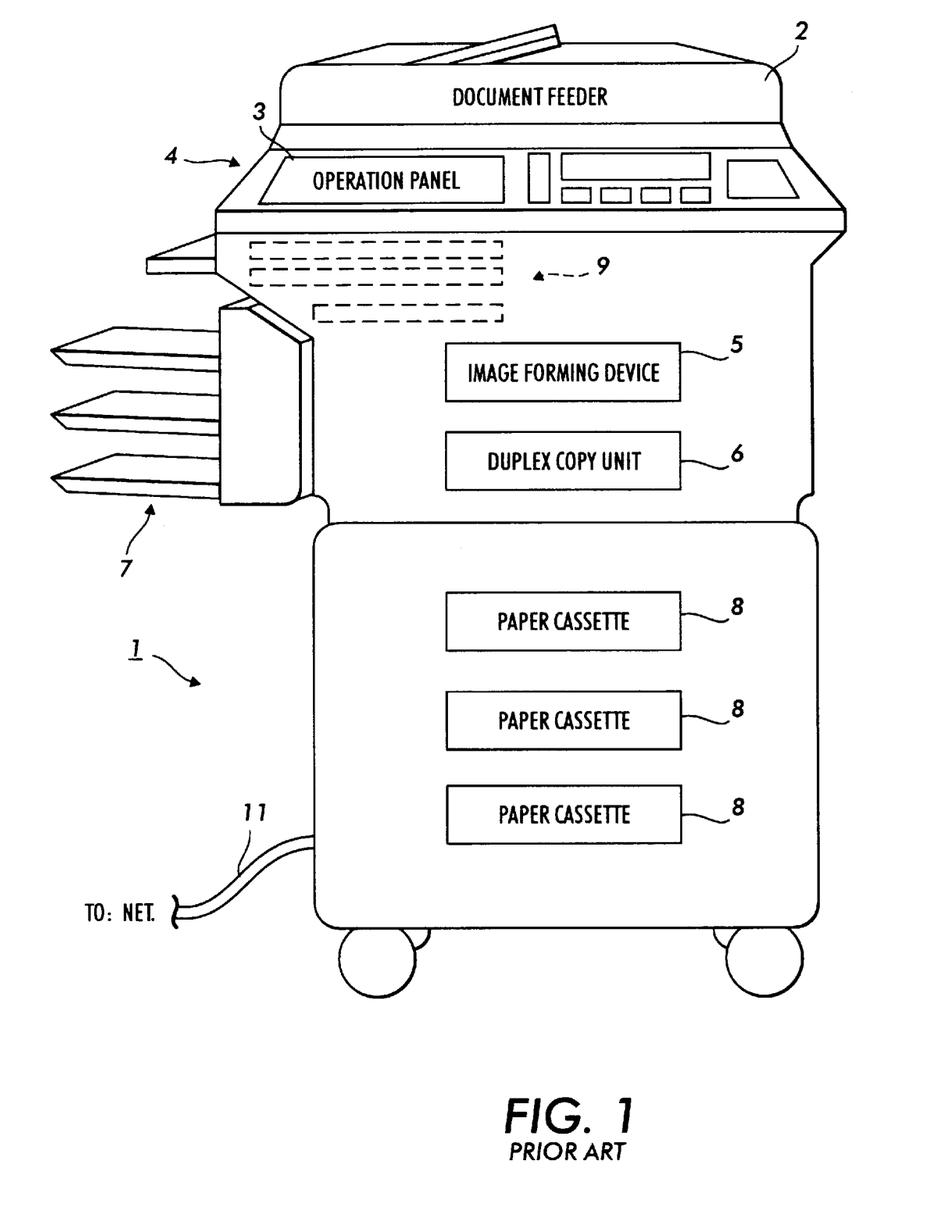
FIG. 1 a perspective view of a networked printing apparatus.

Referring to FIG. 1 of the drawings, a digital printing apparatus of the type suitable for use with the preferred embodiment is designated with the numeral 1. As shown, the system includes a document feeder 2 and an operation (and display) panel or user interface 3. After desired conditions have been entered on the operation panel 3, through the aid of a suitable display, the document feeder 2 conveys a document to a predetermined reading position on an image reading device 4 and, after the document has been read, drives it away from the reading position. The image reading device 4 illuminates the document brought to the reading position thereof. The resulting reflection from the document is transformed to a corresponding electric signal, or image signal, by a solid state imaging device, e.g., a CCD (Charge Coupled Device) image sensor. An image forming device 5 forms an image represented by the image signal on a plain paper or a thermosensitive paper by an electrophotographic, thermosensitive, heat transfer, ink jet or similar conventional system.

As a paper is fed from any one of paper cassettes 8 to the image on forming device 5, the device 5 forms an image on one side of the paper. A duplex copy unit 6 is constructed to turn over the paper carrying the image on one side thereof and again feed it to the image forming device 5. As a result, an image is formed on the other side of the paper to complete a duplex copy. The duplex copy unit 6 has customarily been designed to refeed the paper immediately or to sequentially refeed a plurality of papers stacked one upon the other, from the bottom paper to the top paper. The papers, or duplex copies, driven out of the image forming device 5 are sequentially sorted by a output device 7 in order of page or page by page.

Applications, generally 9, share the document feeder 1, operation panel 2, image reading device 3, image forming device 5, duplex unit 6, output device 7, and paper cassettes 8 which are the resources built in the copier system. As will appear, the applications include a copier application, a printer (IOT) application, a facsimile (Fax) application and other applications. Additionally, the digital copier system is coupled with a network by way of a conventional network connection 11.

Figure 2:
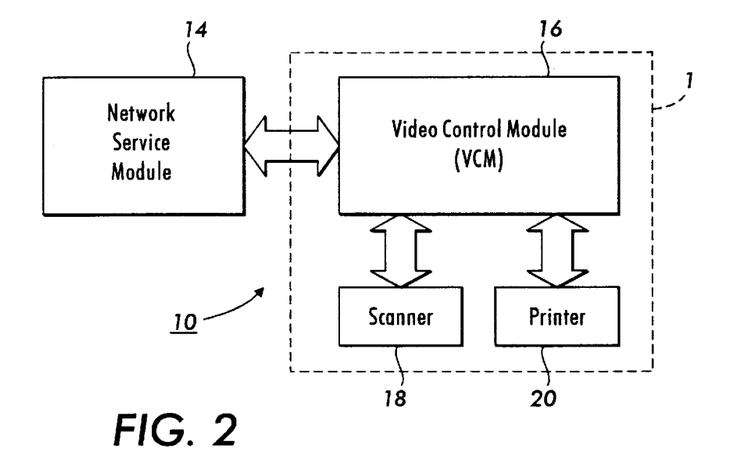
FIG. 2 is a block diagram depicting a multifunctional, network adaptive printing machine.

Referring to FIG. 2, a multifunctional, network adaptive printing system is designated by the numeral 10. The printing system 10 includes a printing machine 1 operatively coupled with a network service module 14. The printing machine 1 includes an electronic subsystem 16, referred to as a video control module (VCM), communicating with a scanner 18 and a printer 20. In one example, the VCM 16, which is described in detail in U.S. Pat. No. 5,579,447 to Salgado, the disclosure of which is incorporated herein by reference, coordinates the operation of the scanner and printer in a digital copying arrangement. In a digital copying arrangement, the scanner 18 (also referred to as image input terminal (IIT)) reads an image on an original document by using a CCD full width array and converts analog video signals, as gathered, into digital signals. In turn, an image processing system (not shown), associated with the scanner 18, executes signal correction and the like, converts the corrected signals into multi-level signals (e.g. binary signals), compresses the multi-level signals and preferably stores the same in electronic precollation (not shown).

Referring still to FIG. 2, the printer 20 (also referred to as image output terminal (IOT)) preferably includes a xerographic print engine. In one example, the print engine has a multi-pitch belt (not shown) which is written on with an imaging source, such as a synchronous source (e.g. laser raster output scanning device) or an asynchronous source (e.g. LED print bar). In a printing context, the multi-level image data is read out of the EPC memory, while the imaging source is turned on and off, in accordance with the image data, forming a latent image on the photoreceptor. In turn, the latent image is developed with, for example, a hybrid jumping development technique and transferred to a print media sheet. Upon fusing the resulting print, it may be inverted for duplexing or simply outputted. It will be appreciated by those skilled in the art that the printer can assume other forms besides a xerographic print engine without altering the concept upon which the disclosed embodiment is based. For example, the printing system 10 could be implemented with a thermal ink jet or ionographic printer.

Figure 3:
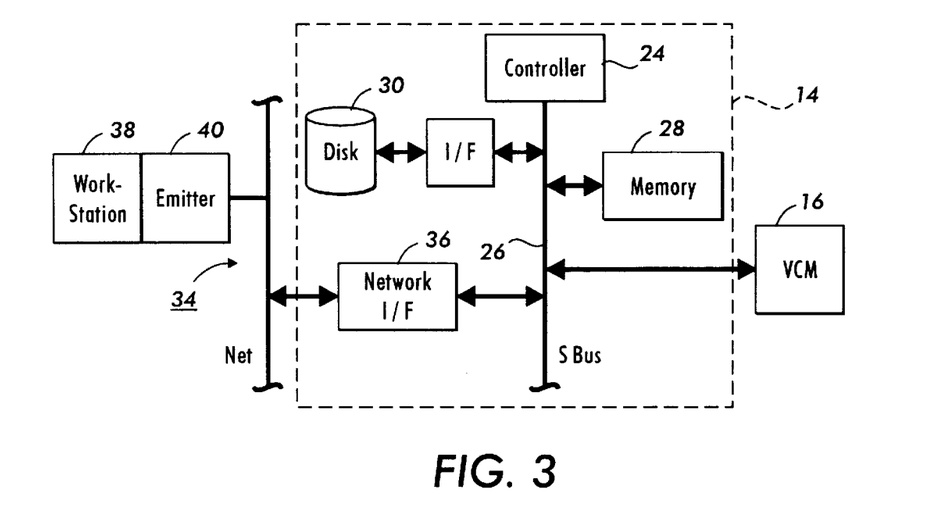
FIG. 3 is a block diagram of a network controller for the printing machine of FIG. 3.

Referring to FIG. 3, the network service module 14 is discussed in further detail. As will be recognized by those skilled in the art, the architecture of the network service module is similar to that of a known "PC clone". More particularly, in one example, a controller 24 assumes the form of a SPARC processor, manufactured by Sun Microsystems, Inc., is coupled with a standard SBus 26. In the illustrated embodiment of FIG. 3, a host memory 28, which preferably assumes the form of DRAM, and a SCSI disk drive device 30 are coupled operatively to the SBus 26. While not shown in FIG. 3, a storage or I/O device could be coupled with the SBus with a suitable interface chip. As further shown in FIG. 3, the SBus is coupled with a network 34 by way of an appropriate network interface 36. In one example, the network interface includes all of the hardware and software necessary to relate the hardware/software components of the controller 24 with the hardware/software components of the network 34. For instance, to interface various protocols between the network service module 14 and the network 34, the network interface could be provided with, among other software, Netware® from Novell Corp.

In one example, the network 34 includes a client, such as a workstation 38 with an emitter or driver 40. In operation, a user may generate a job including a plurality of electronic pages and a set of processing instructions. In turn, the job is converted, with the emitter, into a representation written in a page description language, such as PostScript. The job is then transmitted to the controller 24 where it is interpreted with a decomposer, such as one provided by Adobe Corporation. Some of the principles underlying the concept of interpreting a PDL job are provided in U.S. Pat. No. 5,493,634 to Bonk et al. and U.S. Pat. No. 5,226,112 to Mensing et al., the disclosures of both references being incorporated herein by reference. Further details regarding a technique for generating a job in a PDL may be obtained by reference to the following text, the pertinent portions of which are incorporated herein by reference:

PostScript® Language Reference Manual
Second Edition
Addison-Wesley Publishing Co.
1990

Further details regarding the implementation of a network capable printing system may be obtained by reference to U.S. Pat. No. 5,436,730 to Hube (Issued: Jul. 25, 1995), the disclosure of which is incorporated herein by reference.

Referring again to FIG. 1, while three paper cassettes or print media supply subsystems 8 are shown, it should be recognized that more than three such subsystems could be provided for the printing machine 1 without altering the function thereof. Indeed, it has been found that operation of the printing subsystem is optimized by use of at least four media supply subsystems or "trays". Additionally, at least one other tray is preferably structured as a high capacity feeder ("HCF") (not shown), while another tray is, for the convenience of a user, configured as a special materials handler ("SMH") (not shown). In practice, the HCF is adapted to hold relatively more print media sheets than the other trays, and the SMH is used for, among other things, accommodating special stock, such as envelopes, smaller size paper, letterhead or media for special jobs. In one example, the HCF and SMH are structured as a combination which is mounted adjacent the printing subsystem. The significance of the HCF and the SMH will appear below.

In a preferred embodiment, two trays are internal to the host copier 1 (FIG. 1) while the HCF and SMH are external to the host copier. In one contemplated approach, the internal paper trays are pulled out by an operator for loading, but are not locked to prevent them from being pulled out at inappropriate times. When a given tray is pushed back in, a determination or confirmation of stock type follows in accordance with the principles discussed below.

The stock size in the internal trays is determined by an array of contacts that sense the placement paper tray side guides (not shown). These contacts provide for 15 different "size zones" for the paper in the tray. Each of these zones has a non-settable size range associated with it that is determined by the edge guide placement. An NVM setting defines the default paper size for each size zone in the internal paper trays. This default paper size for each zone applies to that zone setting in all of the internal paper trays (commonly, there is no independent default size per zone for each tray).

In view of the following discussion, it will appear that operation of the printing subsystem is optimized if the four trays are provided with varying degree of programmability. Referring again to U.S. Pat. No. 5,081,595, it is known to provide a system in which tray is fully programmable. This is desirable in a system having a dedicated operator or System Administrator; however, in a "walk-up" printing system of the type suggested in the description above, this high degree of programmability may be undesirable. At the same time a user would not be served appropriately if he or she was deprived the opportunity to program at least one of the trays with such high degree of programmability. Hence in the preferred embodiment, each tray is programmed in at least one of two modes or configurations.

Before describing the three (or four) operational modes of the preferred embodiment, a discussion of selected definitions is in order. The terms "paper", "stock" and "media" are used interchangeably herein. Additionally, stock is typically characterized in terms of three selected "attributes", namely, size, type and color. A complete discussion of these attributes and their significance with respect to stock is provided in U.S. Pat. No. 5,229,814, the disclosure of which is incorporated herein by reference. Preferably, as discussed in further detail below, some attributes are set by way of System Administrator/Key Operator ("SA/KO") setup routines, and other attributes may be set by a casual user. Finally, for certain tray types a confirmation process is preferably required in which "confirmed stock" refers to media which has been loaded in a tray and confirmed either by an operator or the system.

The three tray configurations referred to above include the following:

a) "Fixed" (a.k.a. 'Permanent') trays—these trays have the size, type, and color assigned by the SA/KO—the casual user cannot change these. These trays are thus permanently devoted to a particular stock. In the preferred embodiment, the HCF is to be disposed in the Fixed configuration.

b) "Fully Adjustable" trays. These trays allow the casual user to optionally adjust the size, color, and type of stock in the tray. In practice, the user, as a minimum, confirms the contents of a "user changeable" tray at the completion of each loading process and the tray is not deemed, by the system, as ready, until such confirmation has been provided. The user's confirmation is not, for example, requested or required for refilling operations when the system shuts down because a tray in use runs out of paper. In the preferred embodiment, the SMH is to be disposed in the Fully Adjustable configuration.

c) "Size adjustable" trays—these trays allow the user to place any standard size paper in the tray and does not require a confirmation by the user. The system assumes that the stock in the tray is equal to the default size for a given zone, and assigns the system default values for color and type without displaying the default values. In essence, the system provides the confirmation for the default values.

It should be appreciated that a fourth configuration in which size is fixed and both type and color are adjustable can be provided.

Each tray is preferably defined by a set of properties, which includes:

the stock size range that the tray can handle;

the tray's ability to handle different stock types;

the tray's configuration type (e.g. "fixed", "attribute adjustable", "size adjustable" or "fully adjustable")—each assignment is SA/KO adjustable; and the tray's assignment as "auto selectable" or directly selectable As contemplated, "auto select" permits a tray to be selected for a job without user intervention while "direct select" permits a user to choose which tray appears best suited for his or her job. Additionally, both walk-up and remote users should be able to ascertain the configuration of a tray without necessarily pulling the tray out. Accordingly, an appropriate display should be provided to the user indicating what the particular configuration is. In other words, the degree to which a given tray can be adjusted should be provided in accordance with a scheme such as the one described below:

Referring now to the screens of FIGS. 4–7, programming of the configurable tray arrangement (i.e. the arrangement of at least two print media sheet trays in which each of the at least two print media sheet trays is configurable into one of three operational modes) is discussed in further detail. It will be appreciated by those skilled in the art that each print media sheet tray 8 (FIG. 1) communicates with the user interface ("UI") 3 by way of a suitable controller (e.g. controller 24 of FIG. 3). Through use of the UI, in conjunction with appropriate dialogs or screens, a SA is able to use the controller for configuring each print media sheet tray as either Fixed, Fully Adjustable or Size Adjustable. While the present disclosure is directed toward configuring the trays on an electronic basis, it will be understood that certain mechanical devices could be used to constrain the adjustability of the trays. For example, a mechanical locking mechanism could be provided to one or more of the trays to lock the size guides into place, thus making size adjustment difficult if not impossible. Alternatively, guide locking capability could be achieved with a set of electromechanical switches disposed in or on the print media sheet tray, the switches communicating with the controller 24 for the sake of disposing the tray in the fixed mode.

Figure 4:
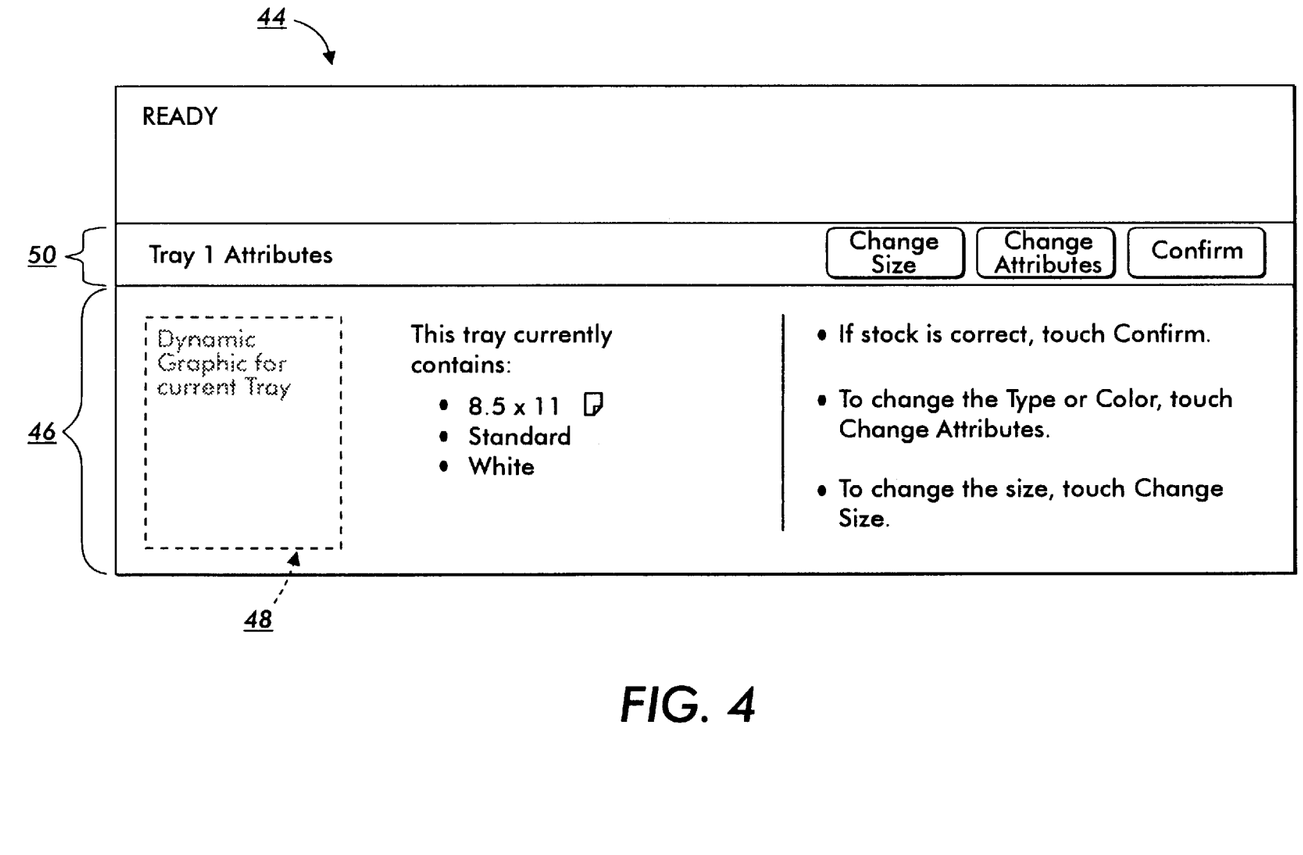
FIG. 4 is an elevational view of a dialog or screen used to confirm the programmed attributes of a configurable print media sheet tray.

The following discussion is directed toward four aspects of tray behavior, namely behavior with respect to (1) adjustable trays, (2) size adjustment, (3) type/color adjustment, and (4) fixed trays:

Referring first to the behavior of adjustable trays, when an operator opens and closes an adjustable tray or causes the state of the SMH to change from empty to not empty a screen or window 44 (FIG. 4) is opened, the open window informs the operator or system user of current settings for the tray (size, type, and color), instructions, and provides options for changing the attribute settings. The window 44 preferably contains a first region 46 with the following items:

A dynamic text region to display the current stock size and orientation;

A dynamic text region to display the current stock type;

A dynamic text region to display the current stock color;

A dynamic graphic 48 to represent the tray—as contemplated herein, the graphic indicates how a print media sheet is to be both oriented in and fed from a corresponding print media tray in which the print media sheet is loaded; and Static text for providing instructions The window 44 contains a second region 50 containing a tool bar with the following items:

Change Size Button: When this button is selected it will open the Change Size window to allow the operator to enter a custom size for the tray.

Change Attributes Button: When this button is selected it will open the Change Attributes window to allow the operator to change the stock attributes.

Confirm Button: When this button is selected the current selections will be saved, the window will be closed and the tray will be made available.

Dynamic Window Title: The text for the window title contains a variable for the current tray being examined.

The settable attributes are size, type, and color. The stock size is, in one preferred example, determined automatically by the positions of the guides in the tray or the operator can choose to enter the size manually. In the case of the SMH the displayed size will be dynamically updated if a change in the size is detected while the window is open. If the change in size results in a change in the attributes which must be displayed, these will be updated dynamically also. If the size guides in the tray are changed such that the tray reports a new "size range" the default size for the new zone will be displayed and the attributes of the stock will be reset to their defaults. Preferably, the operator confirms the current attributes or the changed attributes before the window is removed and the tray becomes available for use by the system.

Figure 5:
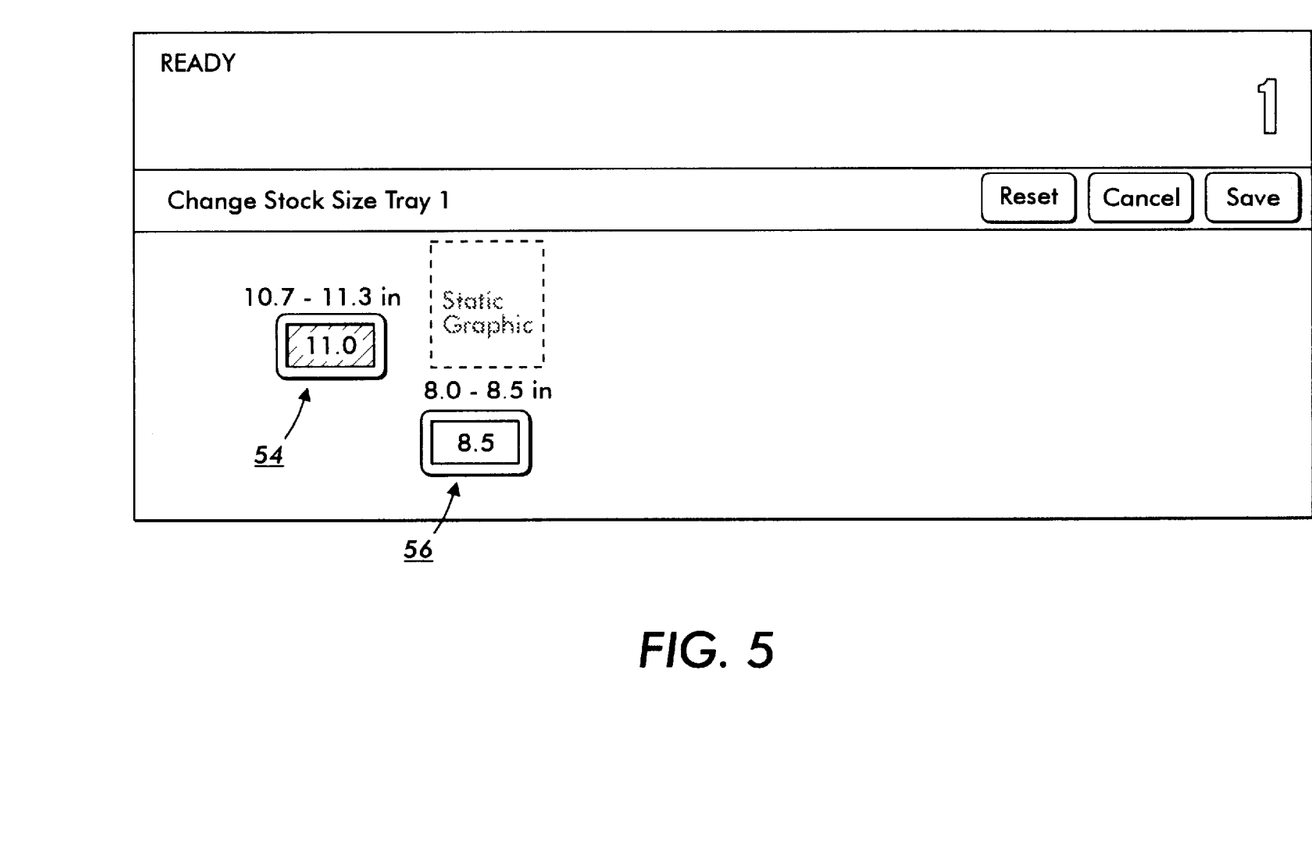
FIG. 5 is an elevational view of a dialog or screen used to change print media sheet size in the configurable print media sheet tray.
Figure 6:
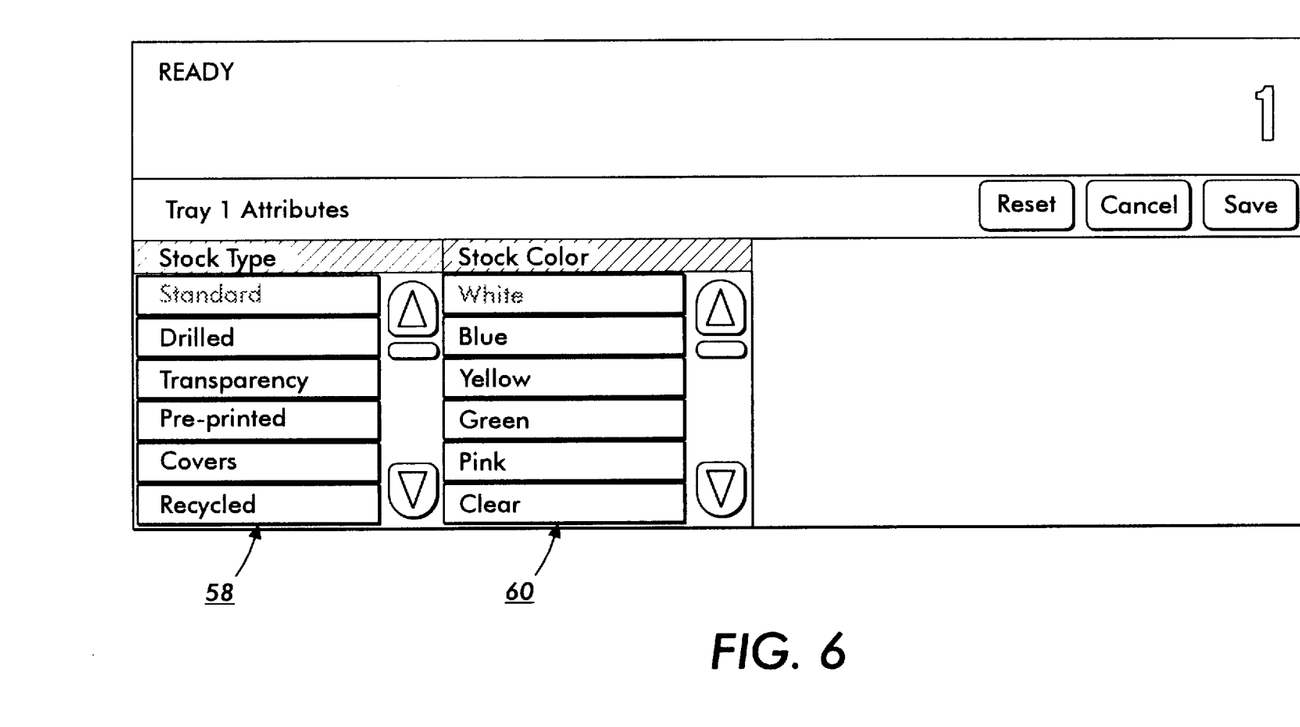
FIG. 6 is an elevational view of a dialog or screen used to program type and color attributes of the configurable print media sheet tray.
Figure 7:
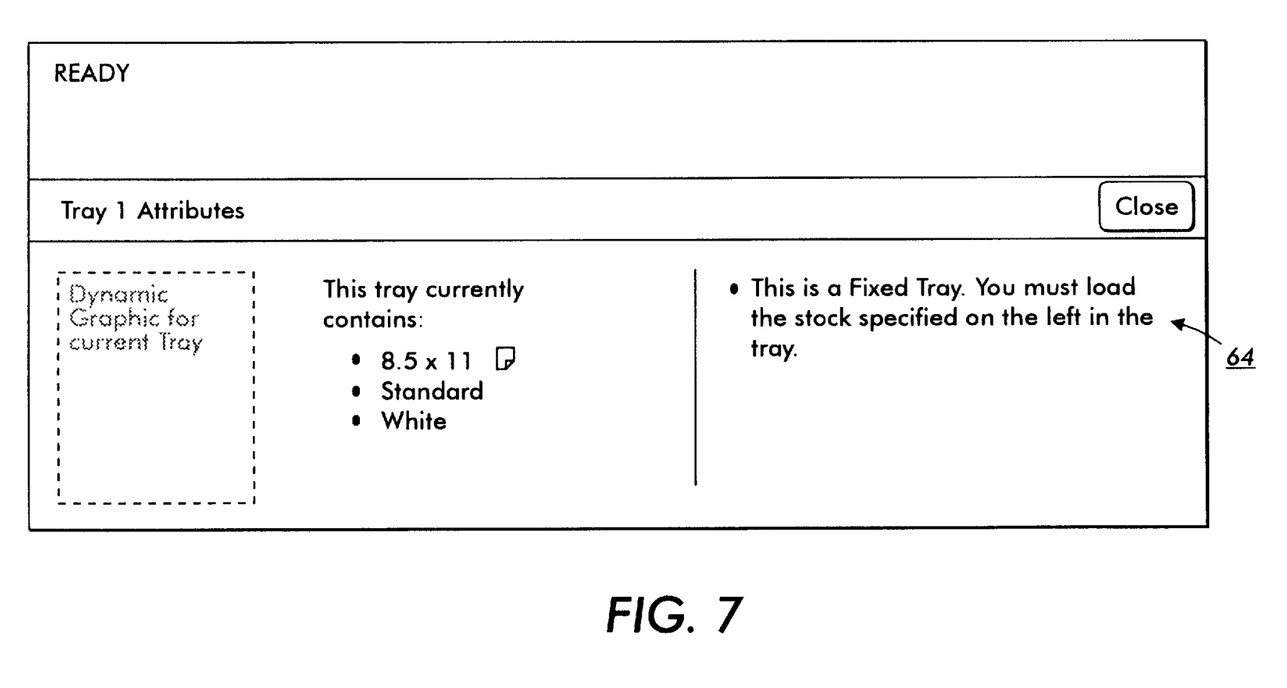
FIG. 7 is an elevational view of a dialog or screen used in constraining the programmability of the configurable print media sheet tray.

Referring second to Size Adjustment (FIG. 5), while the system is capable of indicating size as the guide rails are adjusted, it may be necessary to input size values with the screen and a corresponding keypad (not shown). More particularly, input of size is required when using custom stocks or when the system fails to automatically select an appropriate size for any other reason (e.g. multiple sizes fall within a given zone and the system selects a size above or below the size desired by the user or operator). The "Change Size" window includes the following items:

Two regions 54, 56 for inputting length and width of the custom stock;

A dynamic graphic used to represent the tray hardware. The graphic displayed will be determined by the tray which is being adjusted. In one embodiment, there are two types of adjustable trays; internal and the SMH;

Dynamic text for displaying ranges for Custom Size input areas;

Text in the Tool Bar containing a variable for the tray number;

A Save button which will save the selections made in the window and close the window;

A Cancel button which will reset the selections to the values which were present when the window was opened and close the window; and A Reset button which will reset the selections to the values which were present when the window was opened and the window will remain open.

Upon entry into the Change Size window, the regions or areas 54 and 56 will initially contain default values which vary as a function of the zones, the range of the zones being displayed above the areas 54 and 56. Using the keypad (not shown) the values in the areas can be altered provided such values are consistent with the displayed zones. If inappropriate size values are inputted, the user is provided with a suitable fault message.

Referring third to Attribute Adjustment (FIG. 6), a window, with a tool bar containing a variable for tray number is provided for adjusting stock type and stock color. Most significantly, lists 58 and 60 include the types and colors supported by the system, and may be scrolled through with accompanying soft buttons. As contemplated herein, further types of color and/or types can be added to the lists in order to accommodate for a user's desire to provide customized print media. Selection of type/color attributes is, in one example, obtained by touching suitable lines, such as "Standard" and "White". The window of FIG. 6 further includes a Save button (for saving selections made in the window and closing the window), a Cancel button (for resetting selections to values which were present when the window was opened and closing the window) and a Reset button (for resetting selections to values present when the window was opened and maintaining the window in an open state).

Referring finally to the behavior of fixed trays, when an operator opens a Fixed tray, such as the HCF, a window (FIG. 7) informing the operator of the fixed nature of the tray setting is provided. The window contains a dynamic graphic to represent the current tray as well as dynamic text regions for the following:

the title (to display the correct tray)
the size and orientation of loaded stock
type
color
instructional messages In operation, when the user or operator opens a Fixed print media sheet tray (FIG. 7), he or she will be precluded from accessing the type/color lists described above. Additionally any change in the guides will be detected by the controller (e.g. controller 24 of FIG. 3) and result in the opening of a fault window 64. In turn, a conflict message is displayed in the fault window. If sound is available for the printing machine 1 (FIG. 1), a conflict tone is provided along with the message in the fault window. The window of FIG. 7 will remain open until the tray is closed and the Close button is selected.

Numerous features of the above-described print media sheet tray control arrangement will be appreciated by those skilled in the art.

First, a wide range of programmability or configurability may be provided to accommodate for the varying skill level of those using the machine. More particularly, it should be understood that the presently disclosed printing system is intended for use by highly skilled operators, e.g. SAs, as well as highly unskilled operators, e.g. "walk-up" users. Essentially, the community of system users must be protected from the lack of skill of certain walk-up users without losing the ability to program the host printing apparatus with a significant degree of flexibility. By providing a system in which the attributes of certain trays can be completely or partially fixed, one or more trays can be set as dedicated trays. This is particularly useful when stocks with certain attributes are used frequently by the system community. On the other hand, through the provision of an adjustable tray, special printing needs of the community can still be met.

Second, the control arrangement does more than simply make recommendations as to what trays should be fixed. Through appropriate detection of user activity, the system insures that the attributes of the fixed tray cannot be overridden as a result of the whim of a casual user. This sort of tray fixing insures that a tray intended for a dedicated use, such as a high capacity feeder, is maintained in that state for the benefit of the system community as a whole.

Third, the control arrangement is designed in such a manner that users of an adjustable tray are more than simply encouraged to be "good citizens". In particular, it is undesirable to reconfigure a print media sheet tray without informing the system as to what reconfiguration has occurred. If a user, for example, puts 8.5×11 transparencies in a tray, then that user should be appropriately prompted to reprogram the tray from 8.5×11 standard/white so that a network user is not "fooled" as to what actually exists in the tray. Accordingly, the control arrangement forces each user to confirm his/her reprogramming of an adjustable tray each time s/he uses that tray.

Finally, the control arrangement has a high degree of interactivity at the user interface. If a tray is partially or completely fixed, then the user knows it through the user interface which provides a wide variety of appropriate messages. Moreover, if a tray is being reconfigured, the user interface forces the user to "do the right thing" by prompting the user to be aware of what reprogramming might be required in view of the action taken by the user with respect to the tray.

What is claimed is:

1. A print media sheet tray control system for use with a printing system of the type in which image representations generated from image data are marked on print media sheets, the image representations being marked on the print media sheets in response to one or more control instructions provided to the printing system by a system user, comprising:

a configurable print media sheet tray for storing the print media sheets upon which the image representations are to be marked, the configurable print media sheet tray being characterized by a set of print media attributes disposable in a selected state with the print media attribute set being disposed in a first state, said configurable print media sheet tray being configurable in one or both of a first operational mode and a second operational mode;

a controller for selectively configuring the configurable print media sheet tray into one of the first operational mode and the second operational mode; and said controller disabling printing system operation when said configurable print media sheet tray is disposed in the first operational mode and the system user attempts to operate the printing system with the selected state of the print media attribute set being altered from the first state to a second state, and said controller enabling printing system operation when said configurable print media sheet tray is disposed in the second operational mode and the system user has altered the selected state of the print media attribute set from the first state to the second state in accordance with a selected alteration procedure.

2. The print media sheet tray control system of claim 1, in which the print media attribute set includes a first print media attribute and a second print media attribute, wherein in the first operational mode said controller prohibits printing system operation if either the first print media attribute or the second print media attribute is adjusted with respect to a preselected setting, and in the second operational mode said controller permits printing system operation provided any alteration to either the first print media attribute or the second print media attribute is performed in accordance with the selected alteration procedure.

3. The print media sheet tray control system of claim 2, in which said configurable print media sheet tray is configurable in a third operational mode, wherein said controller permits printing system operation provided the system user only adjusts a selected one of the first print media attribute and the second print media attribute, wherein said print media attribute selection is performed by said controller.

4. The print media sheet tray control system of claim 3, in which the printing system is disposed in the third operational mode, wherein said controller disenables printing system operation when the system user attempts to operate the printing system with both of the first print attribute and the second print attributes being reset relative to their prior preselected settings.

5. The print media sheet tray control system of claim 1, in which said controller, in conjunction with a memory section, maintains a record as to both the operational mode in which the configurable print media sheet tray is disposed and prior settings of the first and second print media attributes, and in which said configurable print media tray is disposed in the first operational mode, wherein:

prior to permitting printing system operation, said controller determines whether the selected state of the print media attribute set has been altered from the first state to the second state; and if said controller determines that the selected state of the print media attribute set has been altered from the first state to the second state, said controller prohibits said marking of print sheets until the selected state of the print media attribute set has been reset to the first state.

6. The print media sheet tray control system of claim 1, further comprising a user interface communicating with said controller, said user interface including a display for indicating whether said configurable print media sheet tray is disposed in the first operational mode or the second operational mode.

7. The print media sheet tray control system of claim 6, in which the configurable print media sheet tray is disposed in the second operational mode, further comprising a graphic representation of an adjustable size attribute element, wherein said selected alteration procedure includes adjusting the graphic representation of an adjustable size attribute element on the display of the user interface.

8. The print media sheet tray control system of claim 6, in which the configurable print media sheet tray is disposed in the second operational mode, further comprising a preprogrammed attribute list, wherein said selected alteration procedure includes altering the selected state of the print media attribute set from the first state to the second state with the preprogrammed attribute list.

9. The print media sheet tray control system of claim 8, wherein a user is provided with the ability to modify the preprogrammed list to accommodate for a particular print media attribute requirement of the user.

10. The print media sheet tray control system of claim 6, in which the configurable print media sheet tray is disposed in the second operational mode, further comprising a graphic representation of the configurable print media sheet tray, wherein said selected alteration procedure includes displaying the graphic representation of the configurable print media sheet tray and using said same to determine an orientation of print media sheets to be loaded in said configurable print media sheet tray.

11. The print media sheet tray control system of claim 6, wherein when said configurable print media sheet tray is disposed in the first operational mode and the system user attempts to operate the printing system with the selected state of print media attribute set being altered from the first state to the second state, a message is displayed at the display of said user interface indicating that operation of the printing system with the print media attribute set in the second state is prohibited.

12. The print media sheet tray control system of claim 11, wherein said selected alteration procedure includes requiring the system user to provide a confirmation signal to the printing system, by way of said user interface, prior to marking print media sheets.

13. The print media sheet tray control system of claim 1, in which the printing system includes a plurality of print media sheet trays with a first one of the plurality of print media sheet trays being a first type of print media sheet feeding apparatus and a second one of the plurality of print media sheet trays being a second type of print media sheet feeding apparatus, wherein each of the plurality of print media trays corresponding with the first type of print media sheet feeding apparatus is configured to operate in the first operational mode and each of the plurality of print media trays corresponding with the second type of print media sheet feeding apparatus is configured to operate in the second operational mode.

14. The print media sheet tray control system of claim 1, in which the printing system includes a plurality of print media sheet trays, wherein a first one of the plurality of print media sheets trays is disposed in the first operational mode and a second one of the plurality of print media sheet trays is disposed in the second operational mode.

15. The print media sheet tray control system of claim 1, wherein disabling of printing system operation is obtained as a direct function of an electronic disabling signal.

16. A printing system of the type in which image representations generated from image data are marked on print media sheets, the image representations being marked on the print media sheets in response to one or more control instructions provided to the printing system by a system user, comprising:

a print media sheet tray control system, including,
a configurable print media sheet tray for storing the print media sheets upon which the image representations are to be marked, the configurable print media sheet tray being characterized by a set of print media attributes disposable in a selected state with the print media attribute set being disposed in a first state, said configurable print media sheet tray being configurable in one or both of a first operational mode and a second operational mode,
a controller for selectively configuring the configurable print media sheet tray into one of the first operational mode and the second operational mode, and
said controller disabling printing system operation when said configurable print media sheet tray is disposed in the first operational mode and the system user attempts to operate the printing system with the selected state of the print media attribute set being altered from the first state to a second state, and said controller enabling printing system operation when said configurable print media sheet tray is disposed in the second operational mode and the system user has altered the selected state of the print media attribute set from the first state to the second state in accordance with a selected alteration procedure.

* * * * *